(12) United States Patent
Fish

(10) Patent No.: US 7,594,172 B2
(45) Date of Patent: Sep. 22, 2009

(54) DATA STORAGE USING SPREADSHEET AND METATAGS

(76) Inventor: Robert D. Fish, 2456 Comer La., Tustin, CA (US) 92782

( * ) Notice: Subject to any disclaimer, the term of this patent is extended or adjusted under 35 U.S.C. 154(b) by 675 days.

(21) Appl. No.: 10/398,669

(22) PCT Filed: Oct. 10, 2001

(86) PCT No.: PCT/US01/31774

§ 371 (c)(1),
(2), (4) Date: Apr. 8, 2003

(65) Prior Publication Data

US 2004/0024737 A1 Feb. 5, 2004

(51) Int. Cl.
*G06F 17/00* (2006.01)
(52) U.S. Cl. .................. 715/255; 715/200; 715/212; 715/810; 707/102; 707/104.1
(58) Field of Classification Search .................. 715/503, 715/530, 810, 212–220, 25, 225, 230, 255; 709/206; 707/10, 104.1, 102; 705/40
See application file for complete search history.

(56) References Cited

U.S. PATENT DOCUMENTS

| | | | | |
|---|---|---|---|---|
| 5,167,016 A | * | 11/1992 | Bagley et al. | 715/531 |
| 5,392,428 A | * | 2/1995 | Robins | 707/3 |
| 5,592,608 A | * | 1/1997 | Weber et al. | 715/863 |
| 5,628,003 A | * | 5/1997 | Fujisawa et al. | 707/104.1 |
| 5,768,580 A | * | 6/1998 | Wical | 707/102 |
| 5,794,236 A | * | 8/1998 | Mehrle | 707/5 |
| 5,835,087 A | * | 11/1998 | Herz et al. | 715/810 |
| 5,999,939 A | * | 12/1999 | de Hilster et al. | 707/102 |
| 6,029,195 A | * | 2/2000 | Herz | 725/116 |
| 6,052,693 A | * | 4/2000 | Smith et al. | 707/104.1 |
| 6,092,090 A | * | 7/2000 | Payne et al. | 715/530 |
| 6,247,018 B1 | * | 6/2001 | Rheaume | 707/102 |
| 6,349,299 B1 | * | 2/2002 | Spencer et al. | 707/10 |
| 6,363,362 B1 | * | 3/2002 | Burfield et al. | 705/40 |
| 6,535,873 B1 | * | 3/2003 | Fagan et al. | 707/3 |
| 6,553,385 B2 | * | 4/2003 | Johnson et al. | 707/104.1 |
| 6,629,104 B1 | * | 9/2003 | Parulski et al. | 707/102 |
| 6,678,695 B1 | * | 1/2004 | Bonneau et al. | 707/102 |
| 6,701,313 B1 | * | 3/2004 | Smith | 707/6 |
| 6,714,939 B2 | * | 3/2004 | Saldanha et al. | 707/102 |
| 6,751,613 B1 | * | 6/2004 | Lee et al. | 707/5 |
| 6,804,684 B2 | * | 10/2004 | Stubler et al. | 707/104.1 |
| 6,886,011 B2 | * | 4/2005 | Beauchamp | 707/5 |
| 6,904,564 B1 | * | 6/2005 | Harris et al. | 715/531 |
| 6,973,423 B1 | * | 12/2005 | Nunberg et al. | 704/1 |

(Continued)

*Primary Examiner*—Doug Hutton
*Assistant Examiner*—James H Blackwell
(74) *Attorney, Agent, or Firm*—Fish & Associates, PC

(57) ABSTRACT

Metatag identifiers are stored in a spreadsheet, and are made available for use in metatagging various files. Steps may include: identifying the item of data in a document; activating an activation code; providing a listing of metatag choices; selecting a metatag from the listing of metatag choices; identifying the selected metatag with a column in the spreadsheet; and storing at least a portion of the item of data in a cell of the column. The listing is preferably a visually displayed listing, and selection can be made by clicking. Data previously associated with a metatag, and stored in the spreadsheet can be displayed as values. The values for a given metatag can thus be sorted and listed, providing immediate feedback to a user to assist in determining the propriety of a particular metatag.

21 Claims, 2 Drawing Sheets

U.S. PATENT DOCUMENTS

| | | | |
|---|---|---|---|
| 6,999,963 B1* | 2/2006 | McConnell | 707/100 |
| 7,032,178 B1* | 4/2006 | McKnight et al. | 715/747 |
| 7,076,728 B2* | 7/2006 | Davis et al. | 715/513 |
| 2002/0046248 A1* | 4/2002 | Drexler | 709/206 |
| 2002/0065830 A1* | 5/2002 | de Hilster et al. | 707/102 |
| 2002/0088000 A1* | 7/2002 | Morris | 725/105 |
| 2002/0194217 A1* | 12/2002 | Hoffman et al. | 707/503 |
| 2003/0167266 A1* | 9/2003 | Saldanha et al. | 707/6 |
| 2004/0078757 A1* | 4/2004 | Golovchinsky et al. | 715/512 |
| 2005/0187920 A1* | 8/2005 | Tenembaum et al. | 707/3 |
| 2005/0256867 A1* | 11/2005 | Walther et al. | 707/5 |

\* cited by examiner

DATA STORAGE USING SPREADSHEET AND METATAGS

FIELD OF THE INVENTION

The field of the invention is computer software, especially data storage technologies.

BACKGROUND OF THE INVENTION

There are numerous different types of databases. One characteristic defining most such databases, however, is the use of a structured method of storing the data. A flat table type of database, for example, is typically stored as a data stream with markers that designate columns and rows. In display of such databases the rows typically correspond to records, and the columns correspond to fields.

Spreadsheets can be thought of as a species of flat table databases, in which the display of the database is used as the sole, or at least a primary, data entry interface. Indeed, it is known to readily exchange data between spreadsheets such as Microsoft™ Excel™ and databases such as Microsoft™ Access™. One difference is that spreadsheets typically include the column identification information in cells of the first row, whereas databases typically include the column identification information in a header that does not appear to a user to be mixed in with the data.

With heightened need to provide simplified connectivity among different platforms and different types of databases, a new form of database that relies on metatags to identify data rather than logical structure. The term "metatag" is used herein to mean an identifier of a type of data content that may be used repeatedly in a document to identify multiple occurrences of data having the particular type of data content. Thus, a metatag may be employed to identify data having data content relating to "price", "description", or "product number", and may even use those exact words as the metatag names. An electronic copy of a letter to a customer may then be "tagged" by blocking a price with the letter, hitting a special activation code, and then typing the word "price". Corresponding data within the letter can be tagged in a similar manner to identify description and product number. It is also known to nest the metatagged data, such as by blocking together the price, description, and product number, and identifying all three items of data with the metatag such as "product". Microsoft™ XML™ is an exemplary proprietary language that employs metatags to store data. XML™ is described in numerous publications, including McLaughlin, Brett, *Java & XML, 2nd Edition: Solutions to Real-World Problems*, O'Reilly & Associates; September, 2001, ISBN: 0596001975, and Harold, Elliotte Rusty and W. Scott Means, Scott W., *XML in a Nutshell: A Desktop Quick Reference* (Nutshell Handbook), Jan. 15, 2001, O'Reilly & Associates; ISBN: 0596000588, both of which is incorporated by reference herein.

A major advantage of metatagged data (also referred to as "tagged" data for simplicity herein) is that such data can be properly identified within substantially any type of document, from an image file to a text file, regardless of the structure of the file. In such instances the tagged data items are readily interspersed among non-tagged data by delimiters that correlate a metatag with its associated data. Another advantage is that data storage space is not wasted on cells for which there is no data. In an ordinary flat database having 20 records and 7 fields, for example, a database system may allocate space for 20*7=140 cells. If only 50 of those cells have data, then 50% of the storage space is wasted. With a metatagged file, there are no unused cells because there are no cells at all.

Conversely, if the metatags are excessively repeated within a document, the use of metatags can also produce inefficiency. If there are 1000 occurrences of each of three data types, it would be much more efficient to store the data in a flat database having 1000 records of 3 fields than using a metatagged structure. The flat database would store the field names only once, but the metatagged structure would store one or another of the metatag names 3000 times.

There is also the problem of knowing which metatags can or should be used to tag data within a document. This is potentially an ongoing problem for those involved in metatagging documents, precisely because metatags they are not limited to a fixed set of names, and there are as yet no generally accepted metatag naming conventions. This is not typically a problem for other types of databases because the person setting up the data base already set a relatively fixed list of possible data fields, and those entering data are limited to those pre-set fields. Moreover, the literal naming of the fields is usually irrelevant to a typical user.

There is still the further problem that tagged data in metatagged files can be difficult to visualize. For example, spreadsheet data is very readily visualized in the well-known column and row format, in which each column effectively stores data for different types of data content. Not only can data in adjacent cells be visually compared, but mathematical functions on data in one row are readily ported to other rows, and mathematical functions on data in one column are readily ported to other columns. All of these things can be very difficult in metatagged documents because data for any given type of content (data that would be listed in the same column of a spreadsheet), can be located all over a document.

It is thus interesting that spreadsheets and metatagged files have advantages and disadvantages that are to a large extent complimentary. This fact either does not seem to have been appreciated by others, or they have not developed a solution to take proper advantage of such complimentarity. Thus, there is a need for methods and embodiments that advantageously combine features of spreadsheets for use with metatags.

SUMMARY OF THE INVENTION

Methods and software are provided in which metatag identifiers are stored in a spreadsheet, and are made available for use in metatagging various files.

In one aspect of the invention an item of data is stored in a spreadsheet using the steps of: identifying the item of data in a document; activating an activation code; providing a listing of metatag choices; selecting a metatag from the listing of metatag choices; identifying the selected metatag with a column in the spreadsheet; and storing at least a portion of the item of data in a cell of the column.

Virtually any document can be metatagged. Preferred embodiments include tagging a text document such as a Microsoft™ Word™ document, or an HTML document such as an Internet Web page. Identifying the item of data can occur in any suitable fashion, including blocking the item of data. Presumably the entire blocked data would be tagged, but a subset (i.e. a portion) could alternatively be tagged. The activation code is preferably a right mouse click operation, but can be any key or combination of keys such as control-shift-m. Verbal or other non-keyboard commands for blocking or activating are also contemplated.

The listing is preferably a visually displayed listing, presumably on a computer screen or other display device. Sorted lists are preferable, and selection can be readily made by clicking. Here again, however, any suitable expression means is contemplated, including verbal reading of choices.

Multiple pages of the spreadsheet can be employed, with both data and metatag names being stored on the same page or on different pages. In the first case the metatag names are probably best stored in the first row of the spreadsheet. In the document, the metatags are preferably stored proximally to the data being tagged.

It is also contemplated that data previously associated with a metatag, and stored in the spreadsheet can be displayed as values. The values for a given metatag can thus be sorted and listed, providing immediate feedback to a user to assist in determining the propriety of a particular metatag. It is still further contemplated that different pages of the spreadsheet can be used to store different sets of data, with the metatags differing at least in part from one page to another. A classification index can be derived that assists a user in determining the propriety of a classification.

Various objects, features, aspects and advantages of the present invention will become more apparent from the following detailed description of preferred embodiments of the invention, along with the accompanying drawings in which like numerals represent like components.

DETAILED DESCRIPTION

Figure 1:
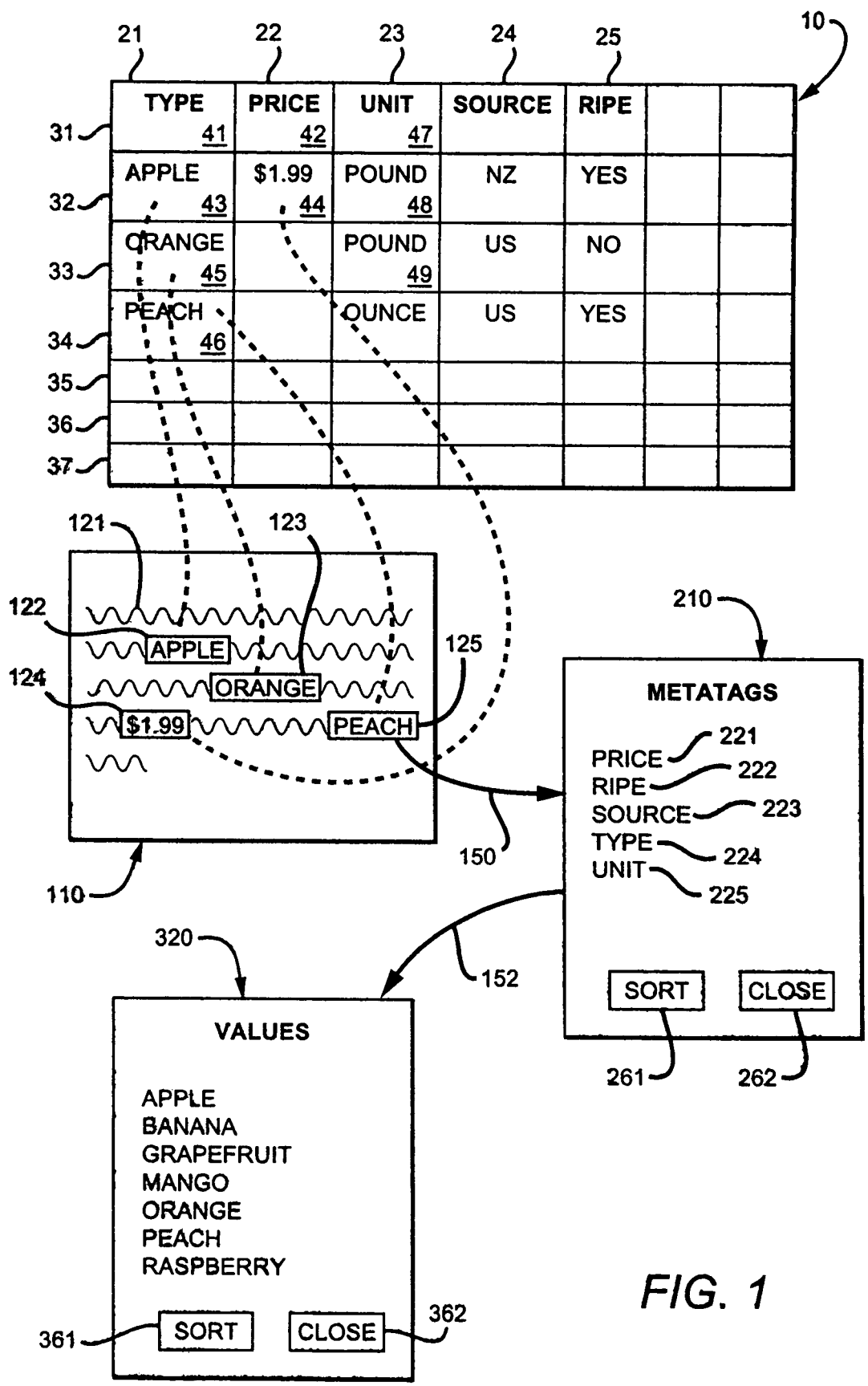
FIG. 1 is a schematic showing correspondences among a spreadsheet, a metatagged document, and various supporting listings.

FIG. 1 generally depicts a spreadsheet 10, a text document 110, a metatag listing 210, and a values listing 310.

Spreadsheet 10 generally includes a plurality of columns 21-25, and a plurality of rows 31-37. Cells occur at the intersection of the columns and rows, including cells 41 and 42 at the intersection of columns 21 and 22 with and row 31, respectively, cells 43-44 at the intersections of columns 21-22 and row 32, respectively, and cells 45-46 at the intersections of column 21 with rows 33-34, respectively. Notwithstanding the drawing, it should be appreciated that spreadsheet 10 is exemplary only, and all sizes and configurations of possible spreadsheets are contemplated. Cells 41, 42 contain metatag names.

Document 110 is preferably a Microsoft™ Word™ file, but may be WordPerfect™ or any other type of text document, or even a non-text document. Especially contemplated are other types of documents including PowerPoint™ presentations, web pages, and so on. Document 110 may therefore have any suitable content, including personal or business letters, advertisements, formal or informal notes, and images and other types of images.

In the particular example of FIG. 1, item 121 is text or other material that is of no particular consequence to the discussion herein, and is therefore shown merely as squiggled lines. Items 122-125 are data items that are stored in cells 43-46, respectively.

Right clicking on data item 125 causes the software to produce a metatag listing 210 as depicted by arrow 150. In this particular example, the listing would contain the metatag names 221-225 stored as data in the cells of row 31. Metatag listing 210 is preferably sorted alphabetically as shown, but may be sorted in any other suitable manner such as by recency of use or relative frequency or use, or may be entirely unsorted. Drop down navigation button 261 advantageously accesses the various options. The display of metatag listing 210 also includes navigation button 262 that closes the display. Vertical or horizontal sliders (not shown) may also be included.

Right clicking on any of the metatag names in metatag listing 210 produces an optional values listing as depicted by arrow 152. In this instance, right clicking on metatag name 224 corresponds to the name stored in cell 41 (due to the sorting), and produce a values listing 310 comprising a list 320 of all the data items in the cells of column 21, including data in cells 43, 45, and 46. The display of values listing 310 also include navigation button 361 that access sort functions, and navigation button 361 that closes the display. Vertical or horizontal sliders (not shown) may also be included.

Figure 2:
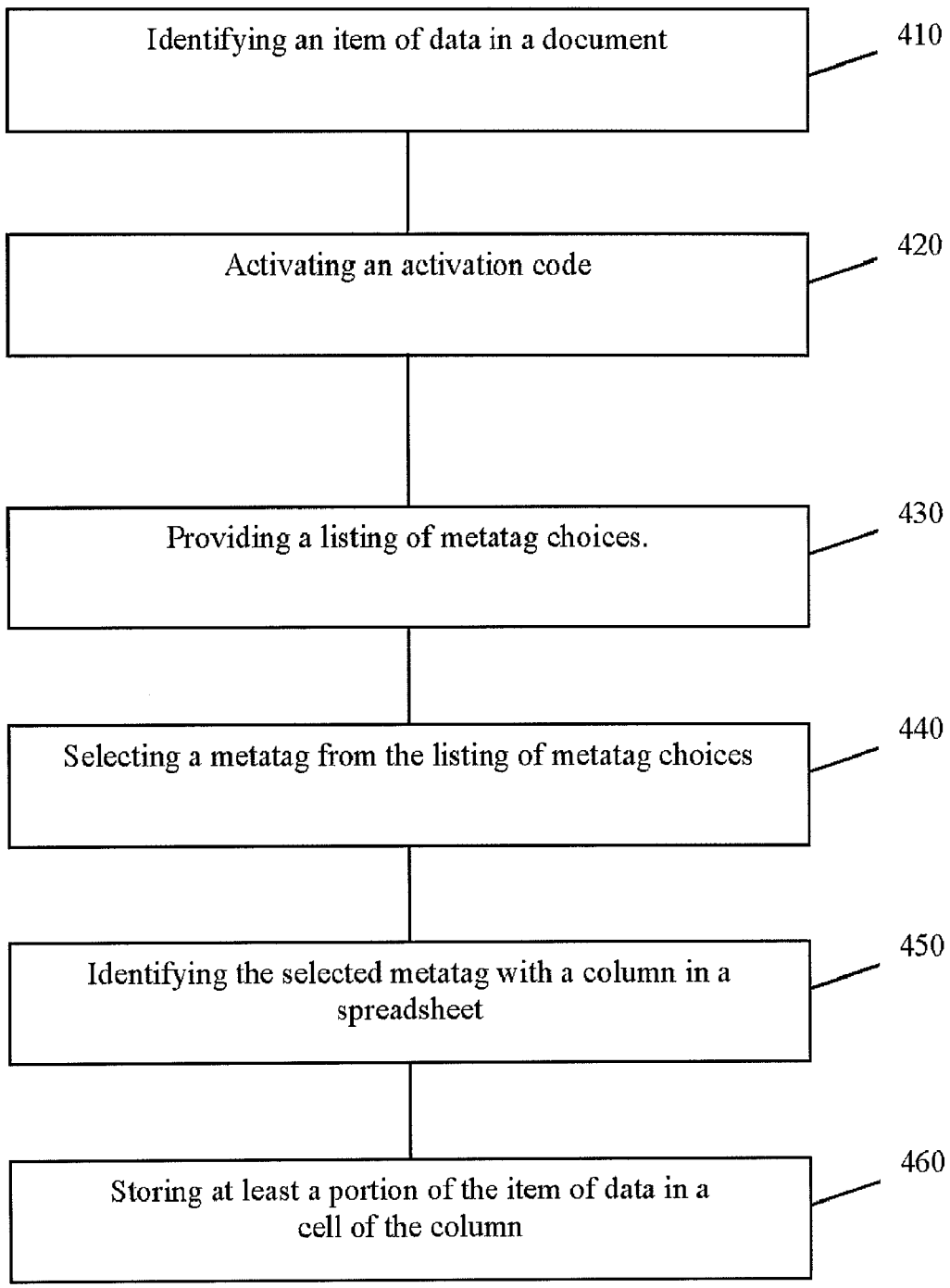
FIG. 2 is a flowchart of steps in a preferred embodiment.

FIG. 2 depicts steps 410-460 that are preferably embodied in software 400. In practice, one would likely store software 400 in the internal memory (not shown) or the mass storage (not shown) of a computer system (not shown). Alternatively, the software or portions of it could be accessed as needed from the Internet or other network. In some or all of these steps the "user" is generally a human user. It is, however, also contemplated that the user can be an electronic entity, such as a computer program or virtual robot.

Step 410 involves identifying the item of data in a document. Here the user identifies what data is to be metatagged. This is preferably accomplished by blocking, which in the Microsoft™ world can currently be accomplished by typing a special code (currently F8), and using the arrow keys. Another current method is to hold down the left mouse button while "dragging" the cursor across area to be blocked. Still another method, which is often used in spreadsheets, is to double click on a cell of the spreadsheet. Non-Microsoft™ systems may have other corresponding methods of accomplishing identification of data, and all such methods are contemplated. It is specifically contemplated that non-contiguous data can be blocked or otherwise identified, and brought together as a single set of data to be metatagged.

Step 420 involves activating an activation code. The software 400 would be likely activated by a hot key such as a right mouse click, although it should be appreciated that the term "right clicking" as used herein can be substituted by any number of other software accessing codes, including keystrokes and combinations of keystrokes.

Step 430 involves providing a listing of metatag choices. Such a listing can be derived from any number of sources. In the example of FIG. 1, the various metatags are stored in the cells of the first row 31 of the first sheet of the spreadsheet 10. In other embodiments the metatags may be stored on another sheet of the same spreadsheet 10, or in an entirely different file such as a database file.

There are numerous advantages to cross-utilizing metatags among many different users, and it is especially contemplated that collections of metatags can be made available across the Internet or some other shared electronic resource. Among other things it is contemplated that cross-utilization would encourage consistency among metatag databases, which ultimately can be extremely useful if any such databases need to be combined or accessed as a unit. In a favored embodiment, a web page or other executable public file could analyze text, keywords, or other data from the document being metatagged. The result of such analysis could then be used to select a subset of potentially useful metatags. For example, if a person is metatagging a web page that refers to automobiles, the system may select a subset of metatags having to do with automobiles, including for example make, model, year, color, condition, price. On the other hand if a person is metatagging a web page that refers to bananas, the system may select a subset of metatags having to do with fruit, including for example source country, producer, weight per box, price per box, ripeness, and so forth.

It is also contemplated that subsets of metatags may be chosen based upon a group tag. In FIG. 1, for example, bracket pairs 126A, 126B are symbolic of group metatags used to designate that data items 122 and 123 are related to each other, and that data items 124 and 125 are related to each other. Contemplated designations for group metatags include classifications such as automobiles, boats, real estate, foods, attorneys, and so forth. Such designations may advantageously be stored in rows along with associated data. Thus, the literal for the group designation of data items 122 and 123 is stored in the cell 48, and the literal for the group designation of data items 122 and 123 is preferably stored in the cell 49. Cell 47 preferably includes a metatag literal such as "Group".

It is still further contemplated that subsets of metatags may be chosen based upon those metatags that have already been utilized in the document. Thus, in further metatagging of the document 10 of FIG. 1, a preferred method would be to recognize that group metatags literals are stored in cells 48, 49, and that individual metatag literals are stored in cells 41, 42. Any or all of that information could be used to locate a subset of perhaps forty to fifty other metatag literals that are commonly used in conjunction with these metatag literals. Search for such a subset can be performed using a local or networked database or other resource.

The listing of metatag choices is preferably sorted alphabetically as discussed above with respect to list 210, and is preferably provided to a user using a CRT, laptop screen, or other visual type display. Alternatively, however, the listing can be provided by any other suitable means, such as by performing an audible reading of the list, or printing a paper copy of the listing.

Step 440 involves selecting a metatag from the listing of metatag choices. In this instance a user examines the listing of possible metatag choices provided in step 430, and selects an appropriate metatag for the data being tagged. Selection can be accomplished by any suitable method, including clicking on a particular choice within a visual display, audibly stating the choice, and so forth. Where there are no suitable choices, the system may allow the user to enter a new metatag, which can then be made available to others.

Step 450 involves identifying the selected metatag with a column in the spreadsheet. This step can be performed manually for very small spreadsheets, but should be performed automatically for any spreadsheet of substantial size. One method of accomplishing the identification is through a standard search command, preferably searching only those cells of the spreadsheet that are likely to contain a literal matching the selected metatag. Thus, if the metatags are stored in cells of the first row of the spreadsheet, as in FIG. 1, it is desirable if the search is directed to the first row only.

Step 460 involves storing at least a portion of the item of data in a cell of the column. Once the column containing the selected metatag is identified, that column is used to store the earlier identified item of data. If this is the first item of data for a group, or if there is no group, then the item of data can be stored in a blank row. If previously associated items of data have already been stored in the spreadsheet for a given group, then the new item of data should be stored in the same row as the previously stored data, but in the recently identified column.

Although it is likely that the entire item of data will be stored in the spreadsheet as just discussed, it is also possible that only a subset of the item of data will be stored. This may occur for several reasons, including oversize of the item. In such instances the data may be truncated, with or without providing a warning of the same to the user. Another reason for storing less than the entire item of data include a desire to eliminate undesirable words or phrases from the database.

Thus, specific embodiments and applications of data storage using spreadsheets and metatags have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A method of storing descriptive metatag-value pairs for parametized information regarding first and second items having differing classifications, comprising:

providing a first electronic interface through which a first human user identifies the first item in a first document to a computer system;

prompting the first user to select a first classification for the first item, wherein the first user selects the first classification for the first item;

providing the first user with a first set of metatag choices determined at least in part by the first user's selection of the first classification;

presenting the first user with:
(a) the first set of metatag choices for possible association with the first item, and
(b) candidate values for at least one of the metatag choices that allows the first user to define a first metatag-value pair;

providing a second electronic interface through which the first user creates a new metatag for the first set of metatag choices which based on an analysis of a second document that includes the second item, is subsequently displayed in the first set of metatag choices to a second human user for the second user to utilize in entering a second metatag-value pair for possible association with the second item in the second document; and storing an association of the first item and the new metatag in a data structure.

2. The method of claim 1, wherein the step of identifying the first item to the system comprises locating the item in a at least one of a text or an HTML document.

3. The method of claim 1, wherein the step of identifying the first item to the system comprises blocking a portion of the item.

4. The method of claim 1, wherein the step of identifying the first item to the system comprises identifying a consumer object as the item.

5. The method of claim 1, wherein the step of identifying the first item to the system comprises identifying real estate as the item.

6. The method of claim 1, wherein the step of identifying the first item to the system comprises identifying a transportation device as the item.

7. The method of claim 1, further comprising selecting the candidate values from a published list.

8. The method of claim 1, wherein at least one of the first set of metatag choices relates to a type of the first item.

9. The method of claim 1, wherein at least one of the metatag choices relates to a quality of the first item.

10. The method of claim 1, wherein at least one of the metatag choices relates to a price of the first item.

11. The method of claim 1, wherein at least one of the metatag choices relates to a source of the first item.

12. The method of claim 1, wherein the data structure comprises a database file.

13. The method of claim 1, wherein the data structure comprises a spreadsheet.

14. The method of claim 13, further comprising identifying a selected one of the first set of metatags with a column in the spreadsheet, and storing one of the candidate values in a cell of the column.

15. The method of claim 1, further comprising: providing a classification index that the first user can utilize to limit the metatag choices.

16. The method of claim 1, further comprising allowing the first user to sort at least some of the first set of metatag choices according to frequency of prior usage.

17. The method of claim 1, further comprising tagging the portion of the first item in a document with a selected one of the first set of metatag choices.

18. The method of claim 1, further comprising activating an activation code to trigger display of at least some of the first set of metatag choices to the user.

19. The method of claim 1, further comprising activating an activation code to trigger display of the candidate values to the user.

20. A computer having a processor and a memory, and running software that executes a method according to claim 1.

21. The computer of claim 20, further comprising a component that links the processor to a network.

* * * * *